(12) United States Patent
Werner et al.

(10) Patent No.: US 12,273,141 B2
(45) Date of Patent: Apr. 8, 2025

(54) OPTICAL CABLE MISMATCH ERROR DETECTION/REMEDIATION

(71) Applicant: INTERNATIONAL BUSINESS MACHINES CORPORATION, Armonk, NY (US)

(72) Inventors: John S. Werner, Fishkill, NY (US); Faezeh Gholami, Ridgewood, NJ (US); Rafaela Frota, Boca Raton, FL (US); Andrew C. M. Hicks, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 285 days.

(21) Appl. No.: 18/187,863

(22) Filed: Mar. 22, 2023

(65) Prior Publication Data

US 2024/0322903 A1  Sep. 26, 2024

(51) Int. Cl.
*H04B 10/03* (2013.01)
*H04B 10/079* (2013.01)
*G02B 6/38* (2006.01)

(52) U.S. Cl.
CPC .......... *H04B 10/03* (2013.01); *H04B 10/079* (2013.01); *G02B 6/3895* (2013.01); *H04B 10/0795* (2013.01)

(58) Field of Classification Search
CPC ....... H04B 10/03; H04B 10/079; H04B 10/40
(Continued)

(56) References Cited

U.S. PATENT DOCUMENTS 7,384,203 B2 * 6/2008 Nagatsuka ............. H02M 1/08
 385/89
9,325,412 B2 * 4/2016 Tsuiki ................. H04B 10/032
(Continued)

FOREIGN PATENT DOCUMENTS

CN 107508631 A 12/2017
EP 1065542 A1 1/2001

OTHER PUBLICATIONS

Ghobadi et al., "Projector: Agile Reconfigurable Data Center Interconnect", Proceedings of 2016 ACM SIGCOMM Conference, Aug. 2016 (pp. 216-229) (Year: 2016).
(Continued)

*Primary Examiner* — Abbas H Alagheband
(74) *Attorney, Agent, or Firm* — Tihon Poltavets, Esq; Kevin P. Radigan, Esq.; Heslin Rothenberg Farley & Mesiti P.C.

(57) ABSTRACT

An optical cable mismatch error detection and remediation process is provided which includes detecting, by at least one processor, an optical cable mismatch error in a connection path between optical transceivers of a computing network, where the connection path includes one or more optical cables. The detecting includes evaluating operation of an optical transceiver of the connection path. The evaluating includes determining that data on one or more optical lanes of the optical transceiver is lane-mismatched data. The process further includes restructuring one or more lane assignments of the optical transceiver, based on determining that the data on the one or more optical lanes of the optical transceiver is lane-mismatched data, where the restructuring addresses the detected optical cable mismatch error.

20 Claims, 10 Drawing Sheets

(58) Field of Classification Search
USPC .......................................................... 398/2
See application file for complete search history.

(56) References Cited

U.S. PATENT DOCUMENTS

| | | | |
|---|---|---|---|
| 9,379,810 B2 | 6/2016 | Ahuja et al. | |
| 9,697,156 B2 | 7/2017 | Arroyo et al. | |
| 9,882,635 B2 | 1/2018 | Guduru | |
| 9,979,468 B2 | 5/2018 | Fujisawa et al. | |
| 10,467,110 B2 | 11/2019 | Arroyo et al. | |
| 10,523,317 B2* | 12/2019 | Masuda | G01M 11/3136 |
| 10,826,602 B2* | 11/2020 | Edwards | H04J 14/0287 |
| 11,139,898 B2* | 10/2021 | Leigh | H04J 14/0227 |
| 2008/0159738 A1* | 7/2008 | Lavranchuk | G02B 6/3895 398/17 |
| 2013/0343764 A1* | 12/2013 | Coffey | H04Q 11/0005 385/89 |
| 2014/0003283 A1 | 1/2014 | Koenen et al. | |
| 2016/0006504 A1* | 1/2016 | Fu | H04B 10/0795 398/24 |
| 2018/0109312 A1* | 4/2018 | Guduru | H04B 10/03 |
| 2019/0258595 A1* | 8/2019 | Okuno | G06F 13/20 |

OTHER PUBLICATIONS

Xie et al., "Open and Disaggregated Optical Transport Networks for Data Center Interconnects", Journal of Optical Communications and Networking, vol. 12, No. 6, Jun. 2020 (11 pages) (Year: 2020).
Werner et al., "Optical Cable Misplug Error Detection/Remediation", U.S. Appl. No. 18/187,857, filed Mar. 22, 2023 (54 pages).
Werner et al., "List of IBM Patents or Patent Applications Treated as Related" for U.S. Appl. No. 18/187,863, filed Mar. 22, 2023 (2 pages).

* cited by examiner

OPTICAL CABLE MISMATCH ERROR DETECTION/REMEDIATION

BACKGROUND

One or more aspects relate, in general, to enhancing processing within a computing network containing optical cable connections within and/or between computing systems of the network, and in particular, to optical cable error detection and remediation within the computing network.

In system networking, such as computer networking, a large number of optical interconnect cables may be used depending on the systems and installation. For instance, a cloud-based data center can have upwards of 100,000 or more servers, while a large enterprise data center can have 10,000 or more servers, and small to medium data centers can have 500 servers or less, all of which include respective cabling infrastructures, such as optical cabling infrastructures, that can have many tens of thousands of optical connection paths within and/or between computing systems or servers of the computing network. As such, data center infrastructure planning can be a difficult task, particularly with there being a wide variety of potential optical cabling variations that satisfy a particular computing network configuration. When designing, installing and/or repairing data center cabling infrastructure, it is possible that optical cables can be misplugged and/or there may be a mismatch in optical cable polarity types, where the mismatch can affect data transfer performance, and in certain instances, prevent optical communication altogether. In many instances, identifying an optical cable error within such a computing environment can be difficult.

SUMMARY

Certain shortcomings of the prior art are overcome, and additional advantages are provided herein through the provision of a computer-implemented method which includes detecting, by at least one processor, an optical cable mismatch error in a connection path between optical transceivers of a computing network, where the connection path includes one or more optical cables. The detecting includes evaluating, by at least one processor, operation of an optical transceiver of the connection path. The evaluating includes determining that data on one or more optical lanes of the optical transceiver is lane-mismatched data. In addition, the computer-implemented method includes restructuring one or more lane assignments of the optical transceiver, based on determining that the data on one or more optical lanes of the optical transceiver is lane-mismatched data. The restructuring is to address the detected optical cable mismatch error. Advantageously, the computer-implemented method improves performance within a computing network containing optical cable connections within and/or between computer systems of the network. Performance is improved by detecting and remediating an optical cable mismatch error within the computing network to enhance data transfer across the connection path.

In one or more embodiments, the restructuring one or more lane assignments of the optical transceiver, based on determining that the data on the one or more optical lanes of the optical transceiver is lane-mismatched data, includes restructuring the one or more lane assignments of the optical transceiver absent any physical change to the one or more optical cables of the communication path between the optical transceivers of the computing network. Advantageously, restructuring the one or more lane assignments of the optical transceiver, absent any physical change to the one or more optical cables of the communication path, facilitates automated remediation of the detected optical cable mismatch error.

In one or more implementations, the restructuring one or more lane assignments of the optical transceiver includes altering in situ the one or more lane assignments of the optical transceiver, based on determining that the data on the one or more optical lanes of the optical transceiver is lane-mismatched data, where the altering in situ of the one or more lane assignments addresses the detected optical cable mismatch error. Advantageously, altering in situ the one or more lane assignments of the optical transceiver, based on determining that the data on the one or more optical lanes of the optical transceiver is lane-mismatched data, facilitates automated remediation of the detected optical cable mismatch error.

In one embodiment, the optical transceiver includes a data transmit and receive system with multiple optical lanes and associated registers, and wherein the restructuring one or more lane assignments includes automatically moving lane-mismatched data from one associated register of one optical lane to another associated register of another optical lane to address the detected optical cable mismatch error. In one or more embodiments, based determining that the data on multiple optical lanes is lane-mismatched data, the restructuring one or more lane assignments includes directing in software a swapping of data within two or more registers of the transmit and receive system to address the detected optical cable mismatch error in the connection path between optical transceivers of the computing network. Advantageously, automatically moving lane-mismatched data from one associated register to another associated register, for instance, by directing in software swapping of the data within the registers, facilitates automated remediation or restructuring of one or more lane assignments of the optical transceiver, based on determining that data on multiple optical lanes is lane-mismatched data.

In one or more embodiments, the detecting and restructuring are based on initiating a test routine between the optical transceivers of the connection path. Advantageously, initiating the test routine between optical transceivers facilitates detecting and remediating an optical cable mismatch error in the connection path between the optical transceivers of the computing network.

In one embodiment, the optical transceiver is one optical transceiver of the connection path, and the evaluating includes receiving a test signal from another optical transceiver of the connection path on respective optical lanes of multiple optical lanes of the one optical transceiver, where the data includes the test signal. Further, the determining includes generating a test lane mapping for the one optical transceiver based on receiving the test signal, where the test lane mapping facilitates determining that data on one or more optical lanes of the optical transceiver is the lane-mismatched data. Advantageously, generating the test lane mapping facilitates improved identification of one or more optical cable mismatch errors, and facilitates remediation of any mismatch errors by restructuring one or more lane assignments of the optical transceiver to address the mismatch errors.

In one embodiment, receiving the test signal includes sequentially receiving the test signal from different transmit lanes of the other optical transceiver of the connection path on the respective optical lanes of the multiple optical lanes of the one optical transceiver of the connection path. Advantageously, sequentially receiving the test signal from different transmit lanes of the other optical transceiver of the connection path on different respective optical lanes of the multiple optical lanes of the one optical transceiver, facilitates producing a lane mapping list (or test lane mapping) which can be used to compare the actual lanes the test signal is received on, versus the expected lanes that the test signal should be received on pursuant to a prespecified lane topology for the optical transceivers.

In one embodiment, the detecting and the restructuring are implemented via software in a computing system of the computing network, where the computing system includes the optical transceiver. Advantageously, the optical mismatch error detection and remediation processes presented facilitate addressing a mismatch error within a computing system of the computing network, and/or between computing systems of the computing network.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, which are incorporated in and form a part of this specification, further illustrate the present invention and, together with this detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, or tools only as examples, and not by way of limitation. Furthermore, the illustrative embodiments are described in certain instances using particular software, hardware, tools, or data processing environments only as example for clarity of description. The illustrative embodiments can be used in conjunction with other comparable or similarly purposed structures, systems, applications, or architectures. One or more aspects of an illustrative embodiment can be implemented in software, hardware, or a combination thereof.

Figure 1:
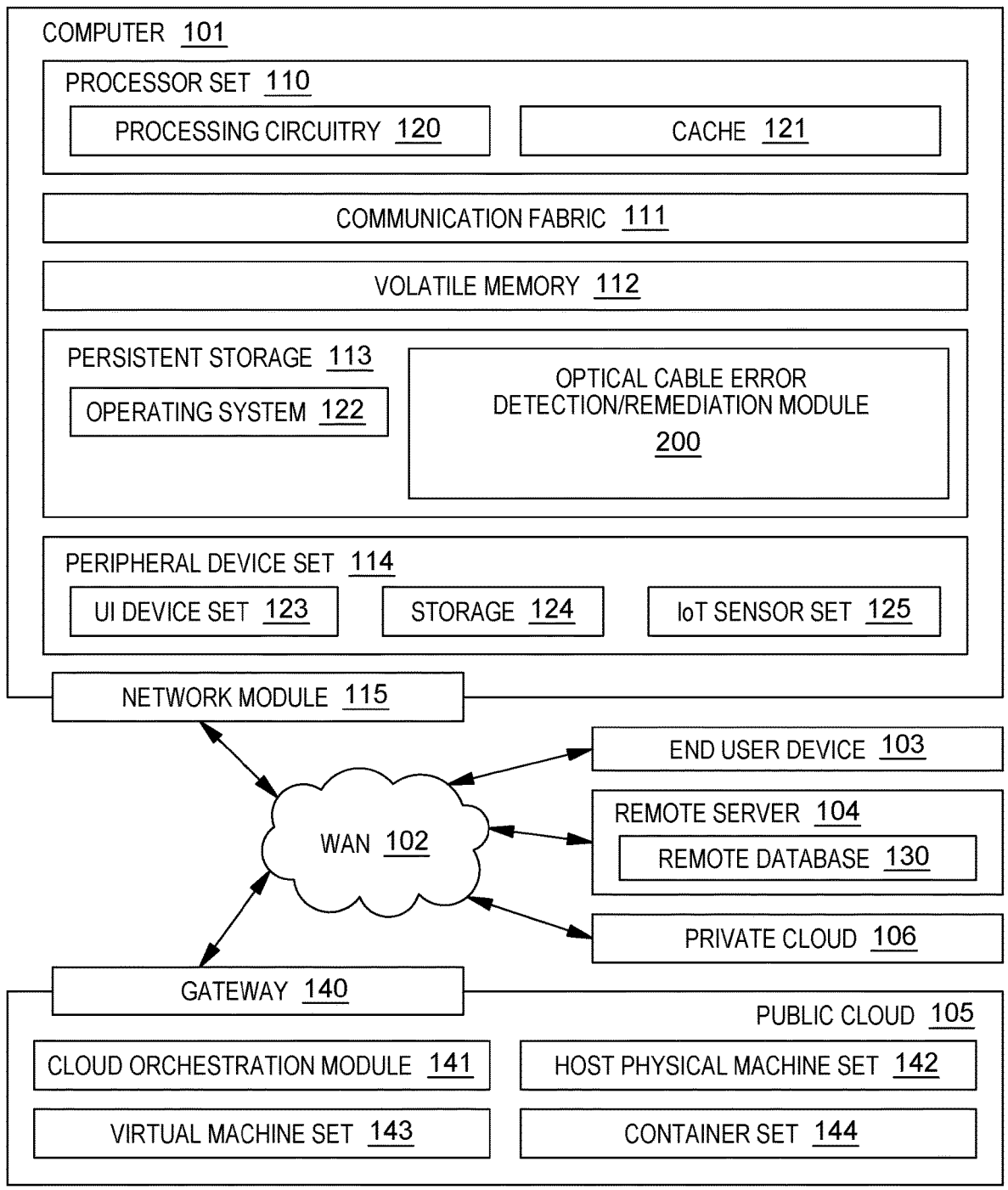
FIG. 1 depicts one example of a computing environment to include and/or use one or more aspects of the present invention.

As understood by one skilled in the art, program code, as referred to in this application, can include software and/or hardware. For example, program code in certain embodiments of the present invention can utilize a software-based implementation of the functions described, while other embodiments can include fixed function hardware. Certain embodiments combine both types of program code. Examples of program code, also referred to as one or more programs, are depicted in FIG. 1, including operating system 122 and optical cable error detection/remediation module 200, which are stored in persistent storage 113.

One or more aspects of the present invention are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one processor or multiple processors, and/or any other type of environment and/or configuration, etc., that is capable of executing a process (or multiple processes) that, e.g., perform optical cable error detection/remediation processing, such as disclosed herein. Aspects of the present invention are not limited to a particular architecture or environment.

Prior to further describing detailed embodiments of the present invention, an example of a computing environment to include and/or use one or more aspects of the present invention is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as optical cable error detection/remediation module block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 126 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. Further, in one or more embodiments, one or more of the components/modules of FIG. 1 need not be included in the computing environment and/or are not used for one or more aspects of the present invention. Further, in one or more embodiments, additional and/or other components/modules can be used. Other variations are possible.

Figure 2:
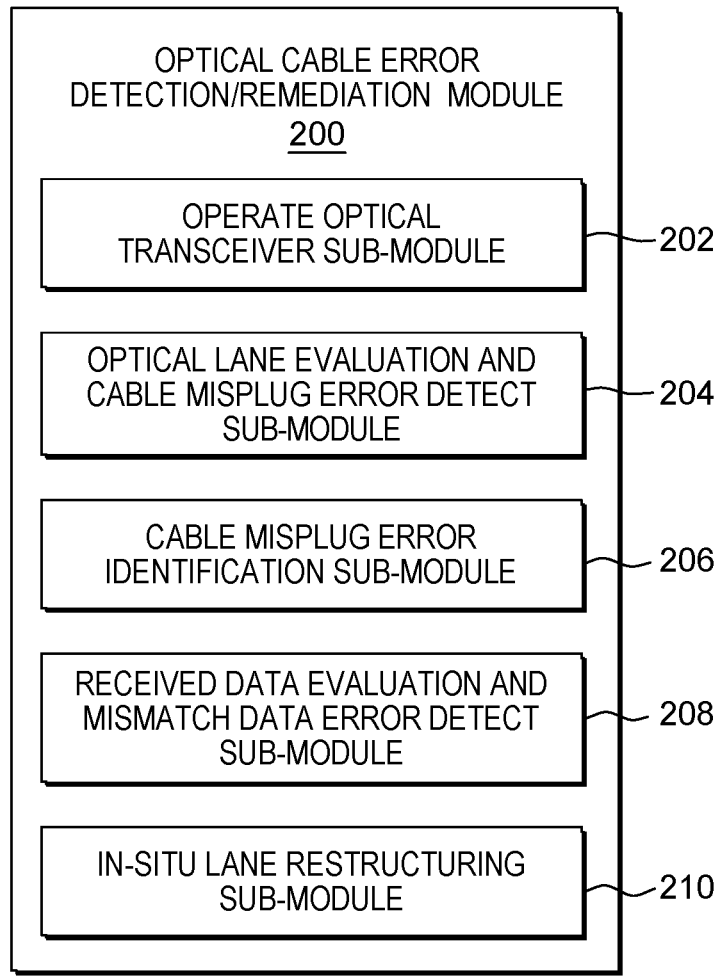
FIG. 2 depicts one embodiment of a computer program product with an optical cable error detection/remediation module, in accordance with one or more aspects of the present invention.
Figure 3:
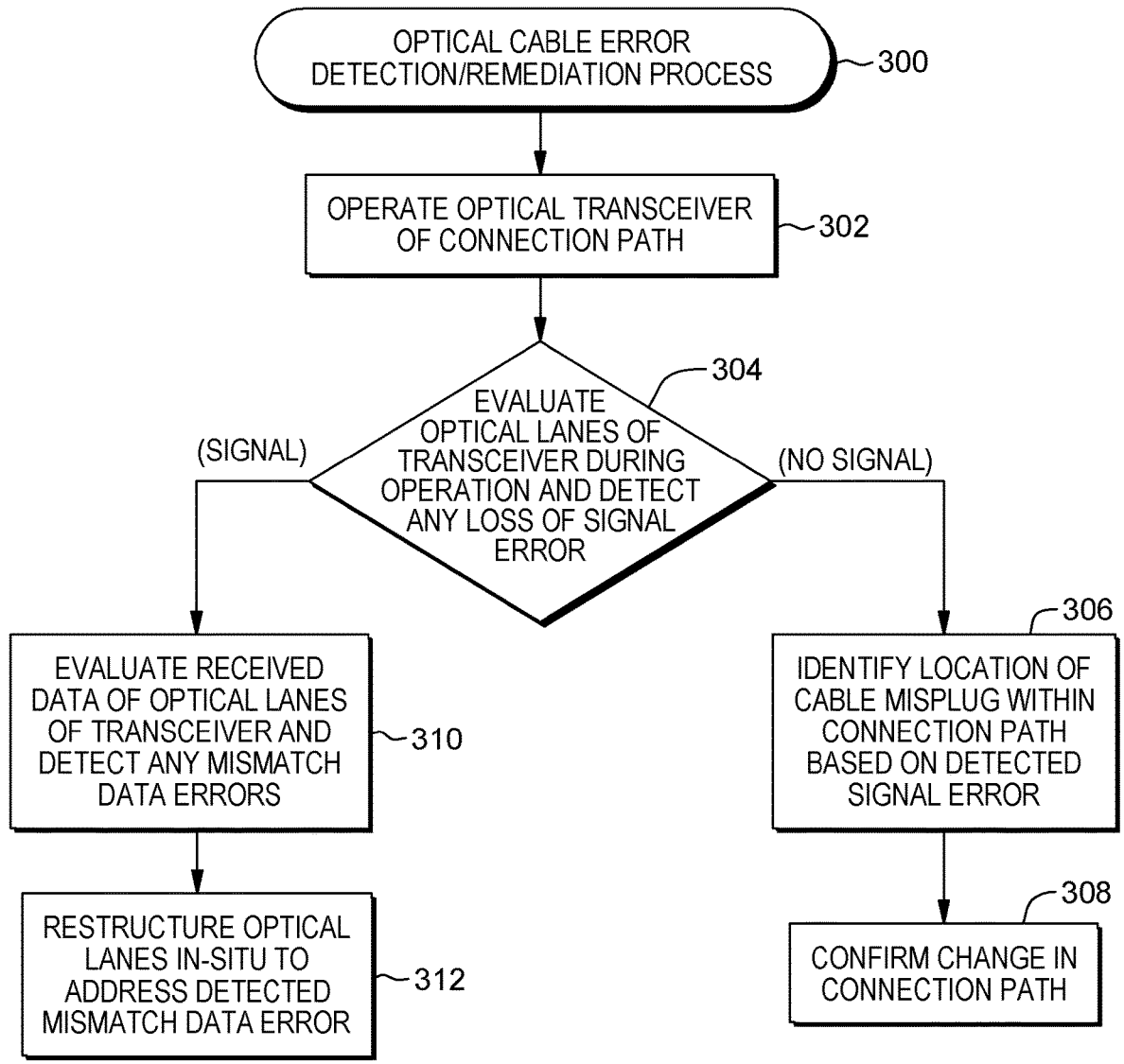
FIG. 3 depicts one embodiment of an optical cable error detection/remediation workflow, in accordance with one or more aspects of the present invention.

By way of example, one or more embodiments of an optical cable error detection/remediation module and process are described initially with reference to FIGS. 2-3. FIG. 2 depicts one embodiment of optical cable error detection/remediation module 200 that includes code or instructions to perform connection path error detection and remediation processing, in accordance with one or more aspects of the present invention, and FIG. 3 depicts one embodiment of an optical cable error detection/remediation process, in accordance with one or more aspects of the present invention.

Referring to FIGS. 1 & 2, optical cable error detection/remediation module 200 includes, in one example, various sub-modules used to perform processing, in accordance with one or more aspects of the present invention. The sub-modules are, e.g., computer-readable program code (e.g., instructions) and computer-readable media (e.g., persistent storage (e.g., persistent storage 113, such as a disk) and/or a cache (e.g., cache 121), as examples). The computer-readable media can be part of a computer program product and can be executed by and/or using one or more computers, such as computer(s) 101; processors, such as a processor of processor set 110; and/or processing circuitry, such as processing circuitry of processor set 110, etc.

In the FIG. 2 embodiment, example sub-modules of optical cable error detection/remediation module 200 include, for instance, an operate optical transceiver sub-module 202 which, for instance, begins or continues optical transceiver operation in a current condition within a connection path of the computing network; an optical lane evaluation and cable misplug error detect sub-module 204, where the current condition and operation of the transceiver is determined based on transmitted and received signals, and where a cable misplug error can be detected based on one or more receive lanes of the optical transceiver not receiving a signal; a cable misplug error identification sub-module 206 to identify location of a fiber-optic cable misplug in the connection path; a received data evaluation and mismatched data error detect sub-module 208, which determines whether there are any lanes with mismatched data errors in the optical transceiver, and if so, detects a mismatched data error; and an in situ lane restructuring sub-module 210, which remediates the detected lane-mismatched data error by in situ restructuring the optical lane assignments. Advantageously, performance is enhanced within a computing network by facilitating detection and remediation of an optical cable error within a connection path between optical transceivers of the computing network. In one or more embodiments, optical cable error detection/remediation processing enhances data transfer across the connection path by detecting and facilitating remediation of an optical cable error, such as an optical cable misplug error, within the computing network. Note that although various sub-modules are described, connection path error detection/remediation module processing such as disclosed herein can use, or include, additional, fewer, and/or different sub-modules. A particular sub-module can include additional code, including code of other sub-modules, or less code. Further, additional and/or other modules can be used. Many variations are possible.

In one or more embodiments, the sub-modules are used, in accordance with one or more aspects of the present invention, to perform optical cable error detection/remediation processing. FIG. 3 depicts one example of an optical cable error detection/remediation process, such as disclosed herein. The process is executed, in one or more examples, by a computer (e.g., computer 101 (FIG. 1)), and/or a processor or processing circuitry (e.g., of processor set 110 of FIG. 1). In one example, code or instructions implementing the process, are part of a module, such as optical cable error detection/remediation module 200. In other examples, the code can be included in one or more other modules and/or in one or more sub-modules of the one or more other modules. Various options are available.

As one example, optical cable error detection/remediation process 300 executing on a computer (e.g., computer 101 of FIG. 1), a processor (e.g., a processor of processor set 110 of FIG. 1), and/or processing circuitry (e.g., processing circuitry of processor set 110), operates an optical transceiver of a network connection path in a current condition 302, and evaluates optical lanes of the transceiver during operation to detect any loss of signal error 304. In one embodiment, processing initiates sending, or determines that a transmitter is sending, an optical signal, and determines whether the optical signal is being received on all transceiver receive lanes within the connection path. Where the signal is not received on one or more lanes, the optical cable error detection/remediation process 300 detects a cable misplug and identifies location of the misplugged cable within the connection path based on the detected signal error 306. In addition, with identifying the misplugged cable location, the process initiates an action to correct the misplugged optical cable in the connection path, and monitors to confirm that a change in the connection path has been made based on the identified misplugged optical cable 308.

Note that in one or more embodiments, initiating an action to correct a misplugged optical cable can include sending a notice by the system to, for instance, a network administrator or other entity that oversees the computing network, or to a robotic device, to facilitate remediation of the optical cable misplug error. In one example, the action is initiated by a computer (e.g., computer 101 (FIG. 1)), a processor of a processor set (e.g., processor set 110), and/or processing circuitry of a processor set (e.g., processor set 110) of the computing environment, with the computer being part of or different from the system performing the optical cable error detection/remediation processing. Based on initiating a generated action, the action is performed. The action can be performed automatically (e.g., using computer code, electronic devices and/or robotic devices) and/or manually, depending on the network. Many possibilities exist.

In one or more embodiments, where the signal is received on all receive lanes, the optical cable error detection/remediation process 300 further includes evaluating received data on the optical lanes of the transceiver, and detecting any mismatched data errors 310, where received data on one or more optical lanes is mismatched data for those lanes. For instance, in one or more embodiments, a data error can occur where transceiver data is received via an unexpected lane assignment at the transceiver, such that a physical cabling error is detected within the connection path, that is, the receive data is considered mismatched or corrupted for the assigned receive lanes. Further, the optical cable error detection/remediation process 300 includes, in one embodiment, restructuring the optical lane assignments to address the detected data errors 312, that is, without making physical changes to the connection path. For instance, in one or more embodiments, a test routine is executed to determine and swap optical lane assignments of one or more transceivers of the connection path.

As noted, in system networking, such as computer system networking, a large number of system interconnect cables may be required depending on the network configuration. Further, infrastructure planning for a sever network of, such as for a data center, can include a wide variety of potential cabling variations which satisfy interconnect needs of the network. When designing and installing cabling infrastructure, it is possible for the designer or installer to misplug optical cables in one or more connection paths, and/or to mismatch cable polarity types in one or more connection paths. An optical cable misplug will typically prevent optical communication along one or more fibers of the optical cable connection path, while a cable polarity-type mismatch can affect the performance of a data transfer, and in certain instance, even prevent optical communication along the connection path. In cases where performance is impacted, but not entirely prevented, it can be difficult to identify the particular location where a cable misplug or a cable polarity-type mismatch has occurred within a connection path. To do so conventionally requires retracing all connections of the computing network infrastructure, which is a time-consuming process.

Advantageously, computer-implemented methods, computer systems, and computer program products are disclosed herein, for detecting an optical cable error in a connection path between optical transceivers of a computing network, where the connection path includes one or more optical cables. The detection and/or remediation process is customer-centric and facilitates an effective mapping, verifying, and remediation of an optical cable error to ensure that a successful, operational connection path is provided within the computing network. In one or more embodiments, the process evaluates operation of an optical transceiver of the connection path, where the evaluating includes determining whether a receive lane of the optical receiver is receiving a signal, and detecting an optical cable error where the receive lane of the optical transceiver is not receiving the signal. In the event that one or more receive lanes of the transceiver are not receiving a signal, the location of one or more misplugged optical cables within the connection path are automatically identified and, for instance, forwarded to a network administrator, network system control, robotic system, etc., to facilitate remediation of the optical cable signal error, for instance, by changing out one or more optical cables of the connection path.

In the event that all receive lanes of the transceiver receive a signal, the optical cable error detection and/or remediation process further includes determining whether received data on a receive lane of the optical transceiver constitutes mismatched data, and based on received data on one or more receive lanes of the optical transceiver being mismatched for the lane assignments, detecting a mismatched data error in the connection path. Further, in one or more embodiments, the optical cable error detection and/or remediation process includes remediating any detected mismatched data error in the connection path by, for instance, in situ reassigning or remapping one or more optical lanes between the optical transceivers of the path, without a physical change to the optical cabling in the connection path.

Advantageously, the optical cable error detection/remediation systems and methods disclosed herein can be provided as a tool for use across a variety of computing networks and a variety of computing systems. Further, the systems and methods disclosed can be used in association with infrastructure planning and/or infrastructure servicing to shorten planning or servicing times with improved root cause error identification and elimination, such as by remediating one or more misplugged optical cables, and/or mismatched data errors through lane assignment restructuring.

Figure 4:
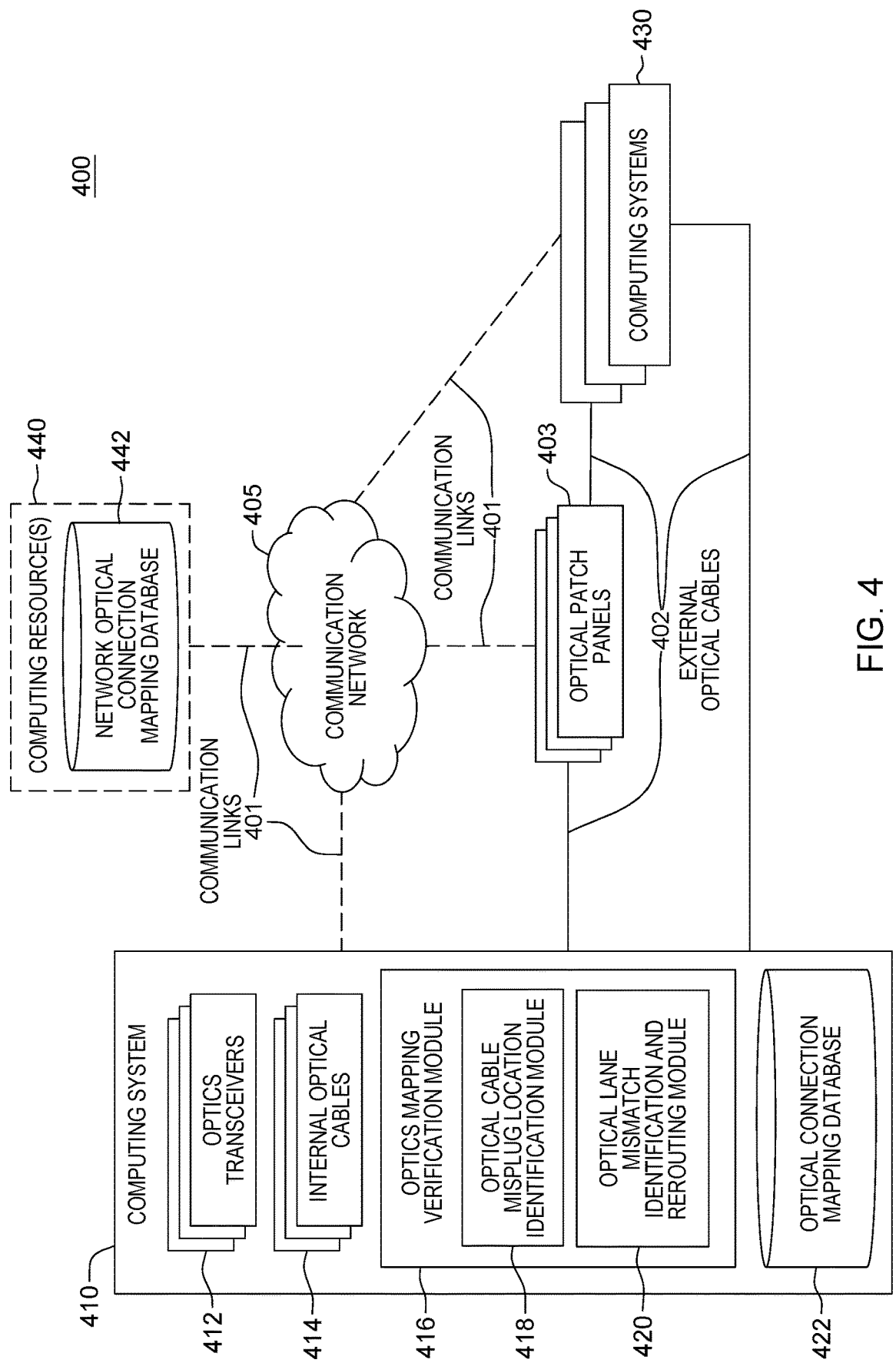
FIG. 4 is a further example of a computing environment to include and/or use one or more aspects of the present invention.

FIG. 4 is a further example of a computing environment or network 400, which can incorporate, or implement, one or more aspects of the present invention. In one or more implementations, network 400 is implemented as part of a computing environment, such as computing environment 100 described above in connection with FIG. 1. Computing network 400 includes, by way of example, one or more computing systems 410, one or more other computing systems 430, as well as one or more computing resources 440, that implement one or more aspects of an optical cable error detection/remediation module or facility, such as disclosed herein. The computing systems 410, 430, and resources 440, communicate, in one embodiment, via one or more communication networks 405 using respective communication links 401. By way of example, the network(s) 405 can be a telecommunications network, a local-area network (LAN), a wide-area network (WAN), such as the Internet, or a combination thereof, etc., and can include wired, wireless, fiber-optic connections, and/or other connections. The network(s) can include one or more wired and/or wireless networks that are capable of receiving and transmitting data, to facilitate one or more aspects of the optical cable error detection/remediation processing disclosed herein, and can use any wired or wireless communication protocol that allows data to be transferred between components of the computing network.

In addition, one or more connection paths are defined via one or more external optical cables 402 between, for instance, computing system 410, computing system 430, and one or more optical patch panels 403. Note that these connection are one example only of one or more connection paths between optical transceivers of a computing network. In one or more other embodiments, a connection path can be defined by multiple optical cables connected in-series, connected by patch panels and/or breakout cables, or by a single optical cable connected between transceivers. Further, the connection path can be a one-to-many connection path, or a many-to-one connection path, or a point-to-point connection path (with a single cable connecting two optical transceivers).

In one or more embodiments, computing system 410, as well as computing systems 430, can be any compute, storage, and/or network device of the computing network which includes computing resources to perform one or more aspects of detecting and facilitating remediation of an optical cable error in a connection path between optical transceivers of the computing network such as disclosed herein. In the embodiment of FIG. 4, computing system 410 includes one or more optical transceivers 412 which allow data transfer within and/or external to computing system 410 in the form of light pulses. For instance, optical transceivers 412 can include any form factor (e.g., small form-factor pluggable (SFP), quad small form-factor pluggable (QSFP), C form-factor pluggable (CFP), 10-gigabit small form-factor pluggable (XFP)), short-reach (SR), long-reach (LR), or extended range (ER), single-mode or multi-mode, any modulation (e.g., non-return to zero (NRZ), pulse amplitude modulation 4 level (PAM4), etc.), or any cable polarity type (e.g., type A, B, C, etc.).

Figure 5:
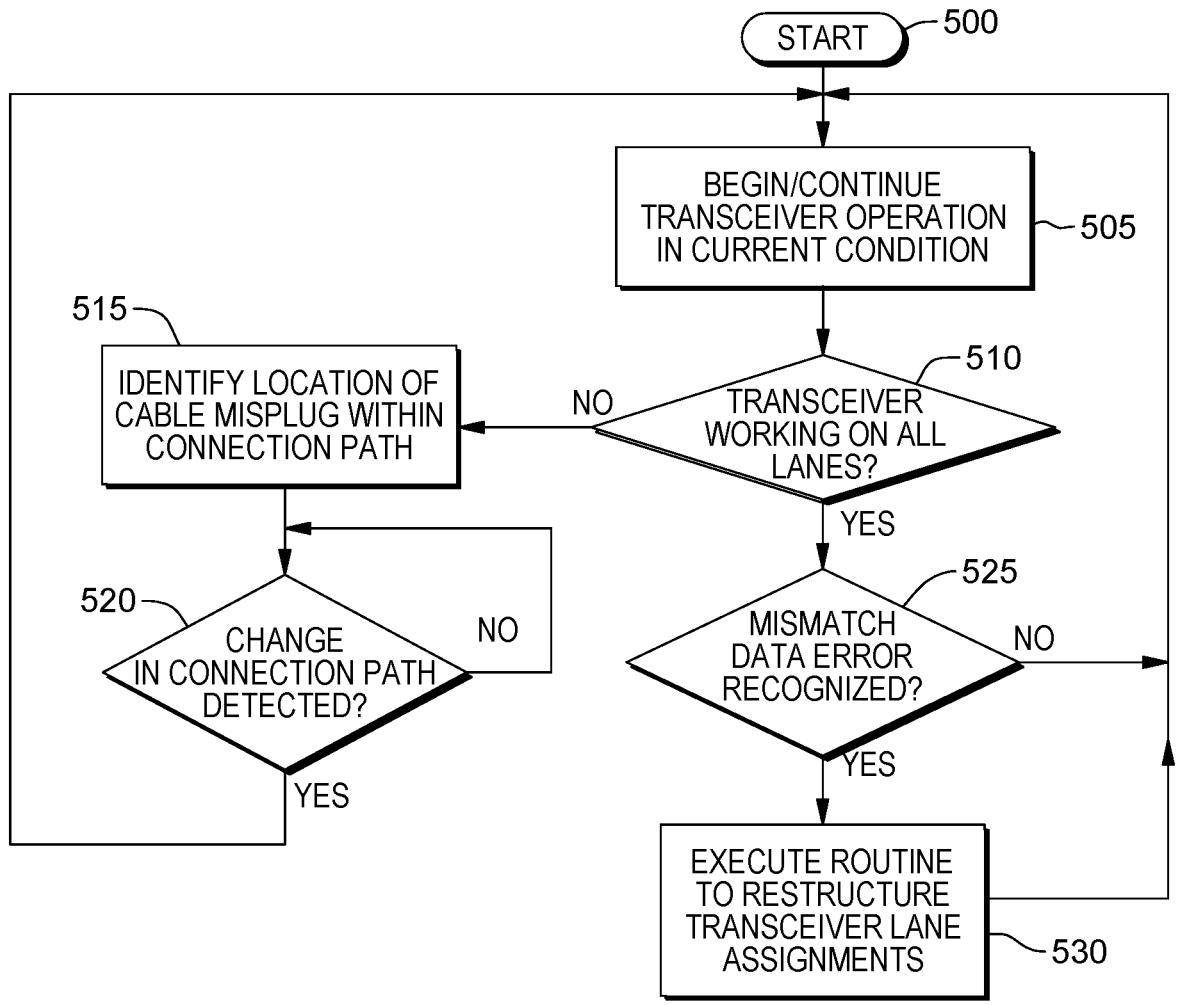
FIG. 5 is another example of an optical cable error detection/remediation workflow, in accordance with one or more aspects of the present invention.

Internal optical cables 414 of computing system 410 are cables with optical connectors in which all connectors connect to optical transceivers 412 within computing system 410 (i.e., cables used for internal communication that do not connect to external components, equipment, or systems). In one or more embodiments, internal optical cables 414 can include any cable polarity type, such as type A, B, C, etc. Optics mapping verification module 416 includes one or more program code modules or sub-modules, such as described herein, including, for instance, an optical cable misplug location identification module 418 and/or an optical lane mismatch identification and rerouting module 420, by way of example. FIG. 5 depicts one embodiment of processing implemented by optics mapping verification module 416.

Figure 9:
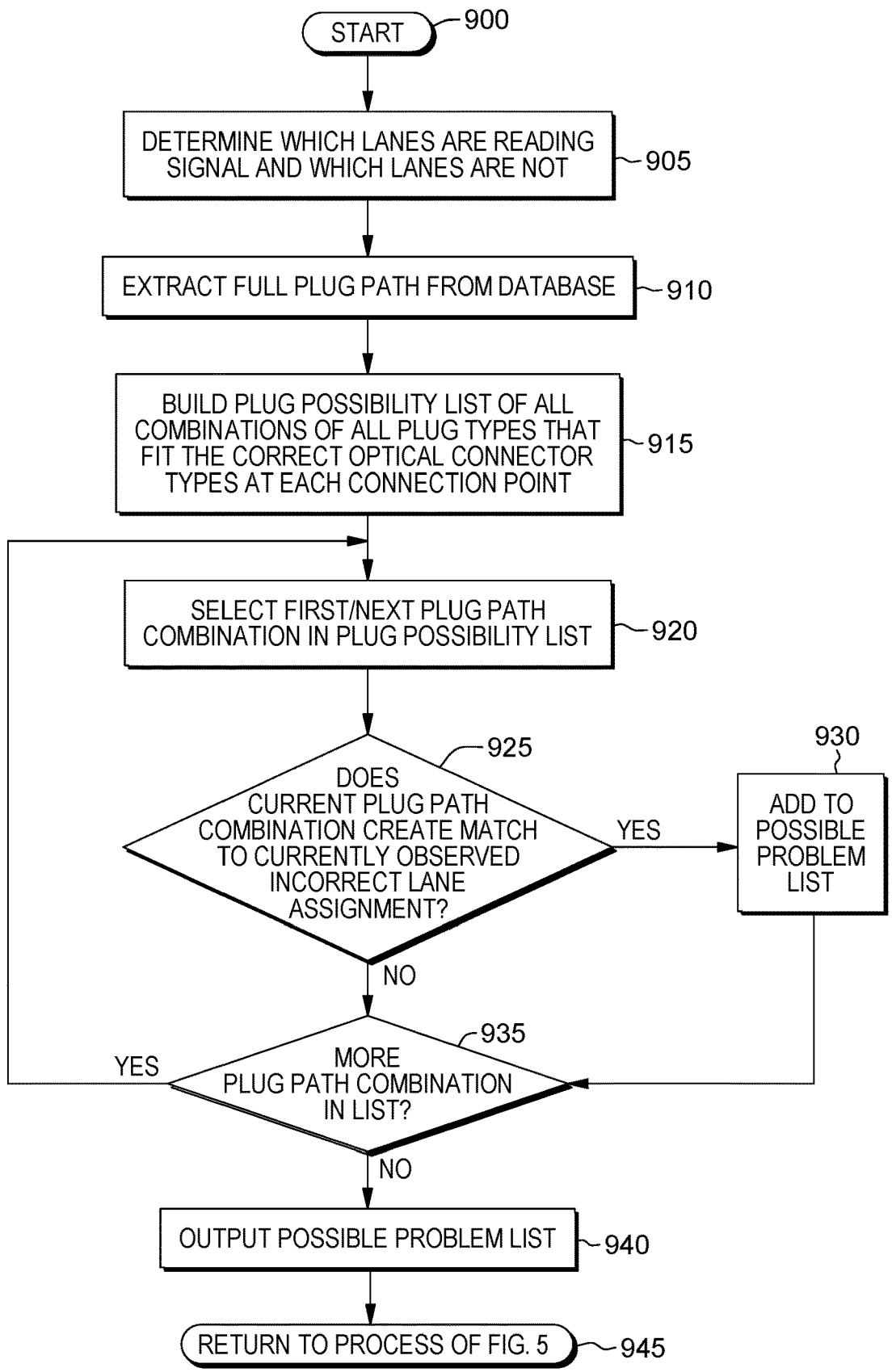
FIG. 9 depicts one embodiment of an optical cable misplug error identification workflow which facilitates identifying a location of a misplugged optical cable within the connection path, in accordance with one or more aspects of the present invention.

Optical cable misplug location identification module 418 identifies, in one or more embodiments, a location of a cable misplug that cannot be corrected by lane assignment restructuring. One embodiment of optical cable misplug location identification module 418 is depicted in FIG. 9, and described further below. Note that optical cable misplug location identification module 418 can store, in one or more embodiments, an optical cable plug possibility list, referenced in the process of FIG. 9.

Optical lane mismatch identification and rerouting module 420 includes program code which when executed performs, for instance, identifying mismatched data on one or more lanes and in situ optical lane restructuring, such as where the transmit and receive lanes of the transceiver are operational, but incorrectly aligned, resulting in mismatched or corrupted data being received on one or more of the receive lanes. One embodiment of the processing of optical lane mismatch identification and rerouting module 420 is described further below with reference to FIG. 10.

In the embodiment of FIG. 4, computing system 410 further includes or references an optical connection mapping database 422. In one embodiment, optical connection mapping database 422 can be implemented in memory of computing system 410 and can contain identification of all optical connections of computing system 410. For instance, the database can contain data about internal optical cables 414, as well as information about optics transceivers 412 within computing system 410 that connect to external equipment via one or more external optical cables 402. In one or more embodiments, optical connection mapping database 422 only contains information about one end of the external connection paths, that is, the connected end that is part of computing system 410. In one or more other embodiments, optical connection mapping database 422 contains information about the full connection paths, even where one end of the optical cable connects to, or is part of, external equipment, such as part of optical patch panels 403 and/or computing system 430. This information can be transmitted through external optical cable(s) 402, or entered by a system administrator, into the database. For instance, in one embodiment, information can be automatically transmitted from computing system(s) 430, which can identify itself and the connection port(s) when communicating back to computing system 410.

In one or more embodiments, computing systems 430 are one or more other compute, storage, and/or networking devices or servers, and can contain one or more instances of the above-noted components 412-422 of computing system 410. Also, in one or more embodiments, a computing system(s) 430 can be located within a same equipment rack as computing system 410, within a same data center, within a same building, or be in an entirely different physical location.

In one or more implementations, optical patch panels 403 are interface panels that connect multiple optical fiber cables and optical equipment. For instance, in one or more implementations, an optical connection path between computing system 410 and a computing system 430 can be routed through one or more optical patch panels 403, two or more of which can use a different cable polarity type (e.g., type A, B, C, etc.) of the connector system, which increases the probability of an optical cable misplug event, with the misplug event to be detected and remediated using optics mapping verification module 416. In one or more embodiments, optical patch panels 403 can also contain computing resources with an optical connection mapping database similar to optical connection mapping database 422 of computing system 410.

External optical cables 402 are optical cables that connect between different components or equipment, such as, for instance, between computing system 410 and a computing system 430, between computing system 410 and an optical patch panel 403, between computing system 430 and an optical patch panel 403, between one optical patch panel 403 and another optical patch panel 403, etc. External optical cables 402 can be of any cable polarity type, for instance, type A, B, C, etc.

Computing resource(s) 440, such as one or more cloud-hosting computing resources, can include program code that implements or accesses a network optical connection mapping database 442. In one embodiment, network optical connection mapping database 442, and/or computing resource(s) 440 communicate with one or more, or all, applicable components in computing network 400 to obtain information about the different optical connections. For instance, in one or more embodiments, this information can be extracted from one or more optical connection mapping databases 422 of one or more computing systems 410, 430. In one or more other embodiments, the network optical connection mapping database data can be fully or partially supplemented (e.g., input) by a network system administrator. In one or more implementations, network optical connection mapping database 422 can be a supervisory control and data acquisition (SCADA) system, a hardware management console (HMC), or any other support element used for system and/or network monitoring and/or control. In one or more embodiments, optical cables within the computing network can be tracked and/or recorded using a data center infrastructure management (DCIM) program.

Figure 7:
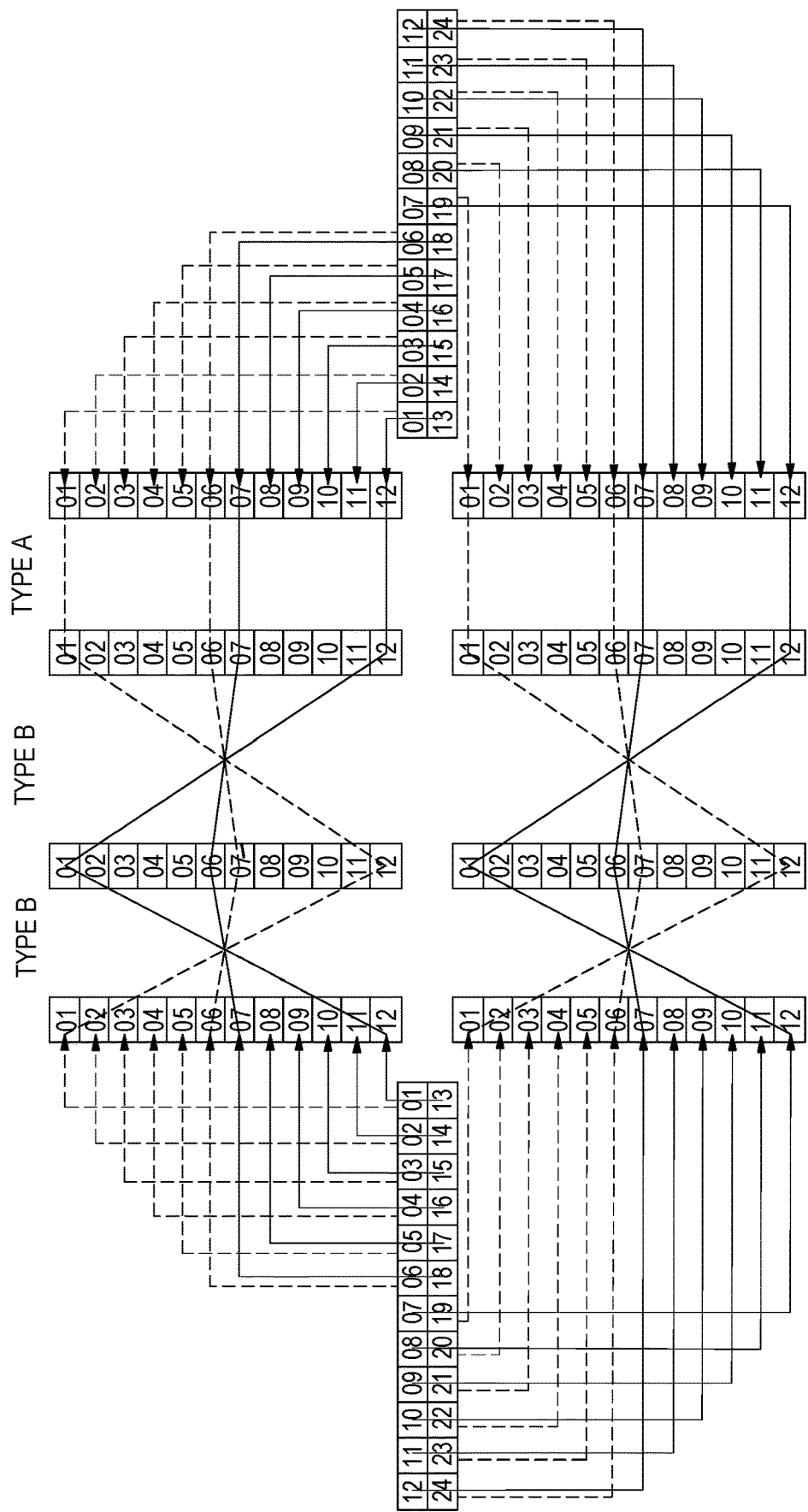
FIG. 7 is an example of a computing network connection path where transceiver data does not appear on one or more intended receive lanes, resulting in an optical cable misplug error being detected, in accordance with one or more aspects of the present invention.
Figure 8:
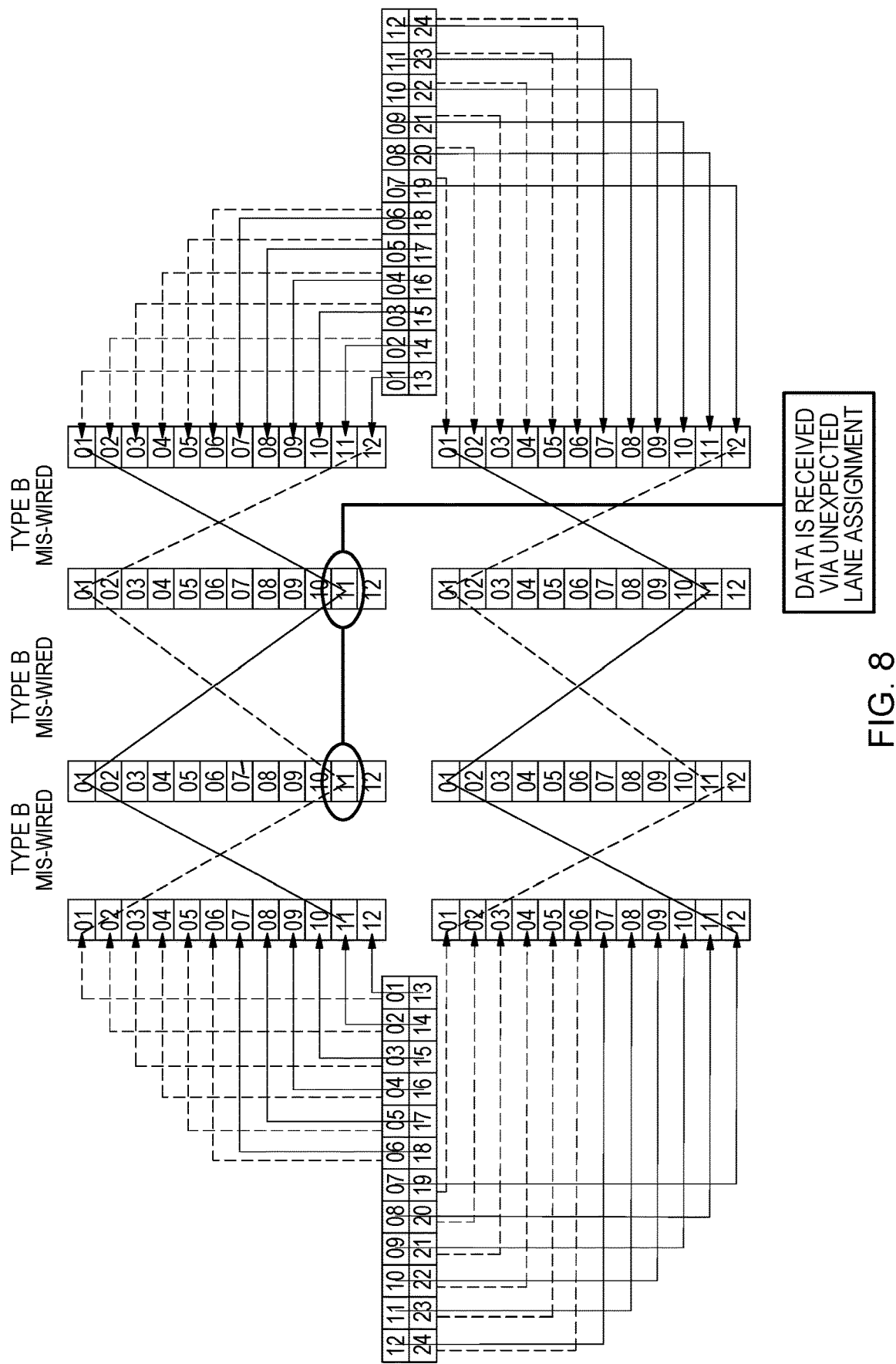
FIG. 8 is an example of a computing network connection path where transceiver data is received via an unexpected lane assignment, resulting in a mismatched data error being detected by the optical cable error detection/remediation workflow, in accordance with one or more aspects of the present invention.

As noted, FIG. 5 depicts another example of an optical cable error detection/remediation workflow, in accordance with one or more aspects of the present invention. In one or more implementations, the workflow of FIG. 5 can be implemented, at least in part, by an optics mapping verification module 416 in the computing network 400 example of FIG. 4. Generally, the workflow of FIG. 5 analyzes operation of an optical transceiver, and determines, for instance, if one or the other of the following conditions exists. In particular, a determination is made whether transceiver data is not appearing on one or more receive lanes of the optical transceiver, such that instructions can be provided regarding a physical cabling error mode within the connection path. An example of this is depicted in FIG. 7, and is contrasted with FIG. 6, which depicts an example of a correct optical cable wiring implementation, for reference. Further, where a signal or data is received on each receive lane of the transceiver, the process determines whether mismatched transceiver data is received on one or more of the lanes, and if so, an in situ lane swapping or reassignment by software is performed to prevent the need for a physical re-cabling in the optical connection path. An example of this issue is depicted in FIG. 8, and discussed further below.

Referring to FIG. 5, the optical cable error detection/remediation process begins 500, with a transceiver operation being initiated and/or continued with the transceiver in a current condition 505. Note that in one or more embodiments, the current operating condition can be an expected condition, with correctly-connected transceiver lane assignments, or a continuing of operation with a restructured lane topology after one or more optical lane reassignments have been performed, or an unexpected condition to be detected and remediated, such as discussed herein.

Processing determines whether the transceiver is working on all lanes 510. Specifically, the current condition and operation of the optical transceiver is determined based on the transmitted and received signals. For instance, the process determines whether the transmitter is sending a signal, and if the signal is being received on all receive lanes within the connection path. In one or more embodiments, the signal can be a test signal generated by the system to test operation of the optical transceivers of the connection path. Note that in one embodiment, checking the operational condition of one or more transceivers can be optimized by analyzing only a subset of lanes associated with one or more of the transceivers. For instance, by analyzing 12 lanes out of a 24-lane transceiver, the process can decipher any cable misplugs based on the available cable types that may have been used in the connection path.

If a signal is not received on one or more transceiver receive lanes of the connection path, code executes to identify a location of a cable misplug within the connection path 515. In one embodiment, this program code can be implemented by optical cable misplug location identification module 418 (in the network example of FIG. 4) to identify the location of a misplugged optical cable that cannot be corrected by lane restructuring. In one or more embodiments, the misplug error can be detected based on a loss of signal (LoS) anywhere within the connection path. One embodiment of a process for identifying location of a cable misplug within the connection path is depicted in FIG. 9, and described further below. Note that, in one embodiment, a loss of signal on all lanes can indicate, for instance, that a transceiver, patch panel, etc., has been deactivated (e.g., manually deactivated by a user). This information can be provided to a network administrator in lieu of executing the optical cable misplug location identification process, such as the process of FIG. 9.

In one or more embodiments, the workflow includes determining if a physical change in a connection path is detected 520 after identifying location of the cable misplug within the connection path. In one or more embodiments, this can be determined via detection of a change in status of a loss of signal indication on one or more optical lanes of the transceiver. In one or more other embodiments, a control system or an operator can identify, via a system interface (e.g., with a DCIM), that a physical change to the connection path has been made to correct the identified optical cable misplug. If no physical change is made within the connection path, then in one embodiment, the workflow continues to wait at inquiry 520 for the change to occur. If a physical change has been made within the connection path, then the process loops back to continue with transceiver operation under conditions of whatever physical change was made to the connection path. If there is still a connection issue, for instance, an incorrect cable was swapped into the connection path, processing will detect that error on the next iteration through the workflow, and repeat the process.

Assuming that the transceiver is working on all lanes 510, then processing determines whether a mismatched data error is recognized 525. A mismatched data error means that the received data has been corrupted. For instance, data will appear corrupted if a signal is not being received on the intended optical lane, as exemplified in FIG. 8. In one or more embodiments, one or more known test data signals can be transmitted during the process to determine if the received signal matches what is expected.

In one or more embodiments, where test data received on one or more optical lanes of the transceiver is mismatched, then processing executes code, or a routine, to restructure one or more of the transmitter lane assignments 530, that is, to swap in software one or more lane assignments. For instance, in one embodiment, this can be accomplished using an optical lane identification and rerouting module 420 in the network 400 example of FIG. 4. One embodiment of optical lane mismatch identification and rerouting processing is described below with reference to FIG. 10.

In one or more embodiments, if the received data is not corrupted, or after lane reassignment has been implemented for any mismatched data received, processing returns to block 505 to continue monitoring (e.g., periodically monitor) transceiver operation on the connection path.

Figure 6:
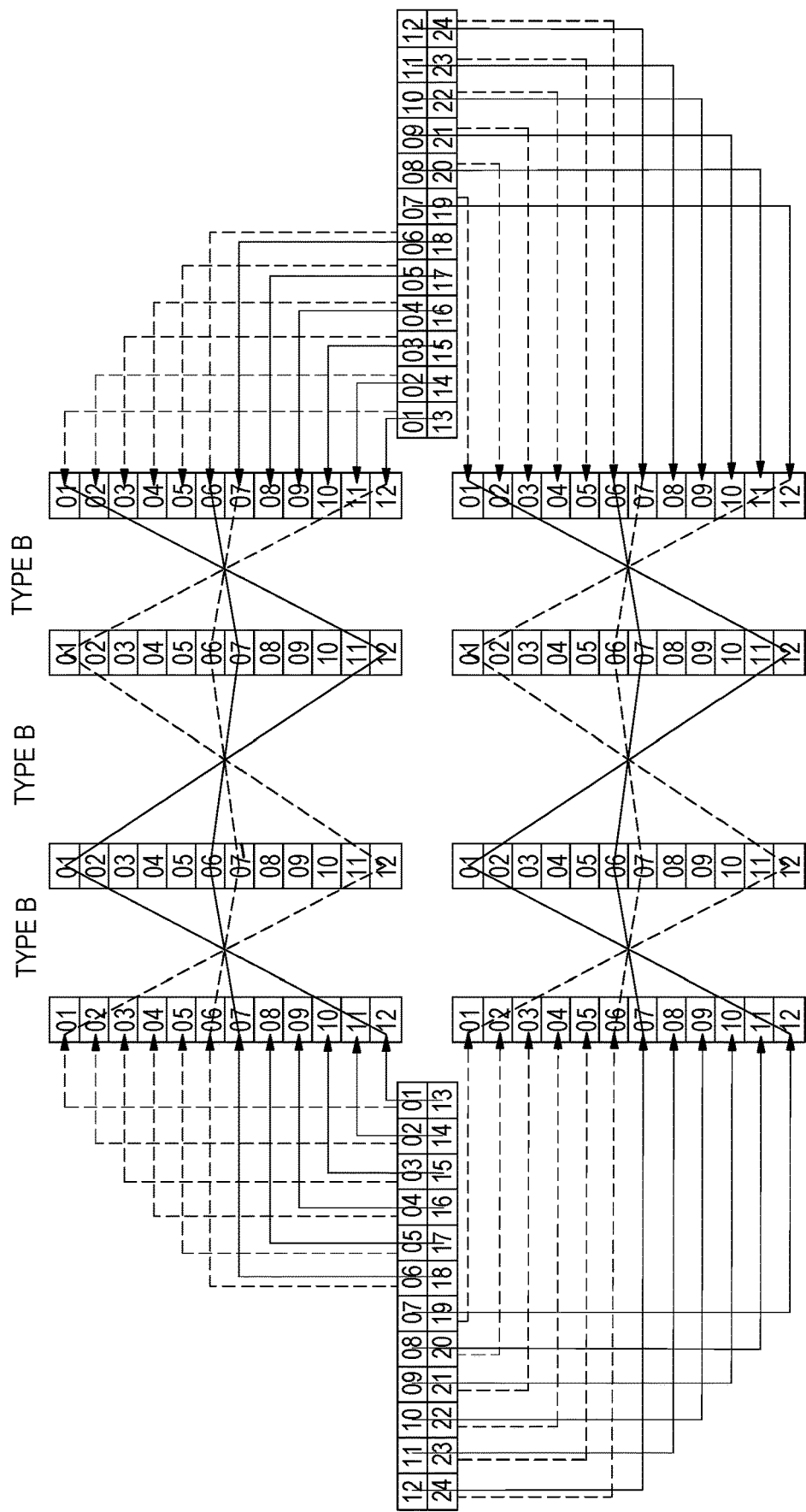
FIG. 6 is an example of a computing network connection path where data is correctly transferred between transceivers via expected lane assignments, in accordance with one or more aspects of the present invention.

FIG. 6 depicts an example connection path, where transceiver data is correctly transferred via expected lane assignments, such that physical cabling errors are not detected within the connection path by the optical cable error detection/remediation processing disclosed. If wired in this manner, the process depicted in FIG. 5 would take the following path: from block 505, to inquiry 510, to inquiry 525, and back to block 505. Note, with respect to FIG. 6, that appropriate cable orientation (i.e., 'key up' or 'window up' and 'key down' or 'window down') is assumed. Note also, with respect to the example of FIG. 6, that lanes 1-12 are receive lanes of the transceivers, and lanes 13-24 are transmit lanes of the optical transceivers on the different ends of the connection path.

As noted, FIG. 7 depicts an example instance where transceiver data is not appearing on one or more receive lanes, such that an optical cable misplug error is detected and a location is to be identified to facilitate correcting a physical cabling error made within the connection path. In one or more embodiments, the example of FIG. 7 can be identified as a result of executing the process of FIG. 5 by reaching block 515 due to a loss of signal (i.e., due to transmit lanes aligning with other transmit lanes, and receive lanes aligning with other receive lanes). In one or more embodiments, the process of FIG. 9 can be executed to supply an optical cable list identifying one or more particular optical cables in the connection path that need to be replaced or reconnected. For instance, the list could identify the Type A cable needs to be replaced between the third and fourth patch panels, in the example of FIG. 7. Again, appropriate cable orientation is assumed in FIG. 7, and lanes 1-12 are receive lanes and lanes 13-24 are transmit lanes for the transceivers on the opposite ends of the connection path.

Figure 10:
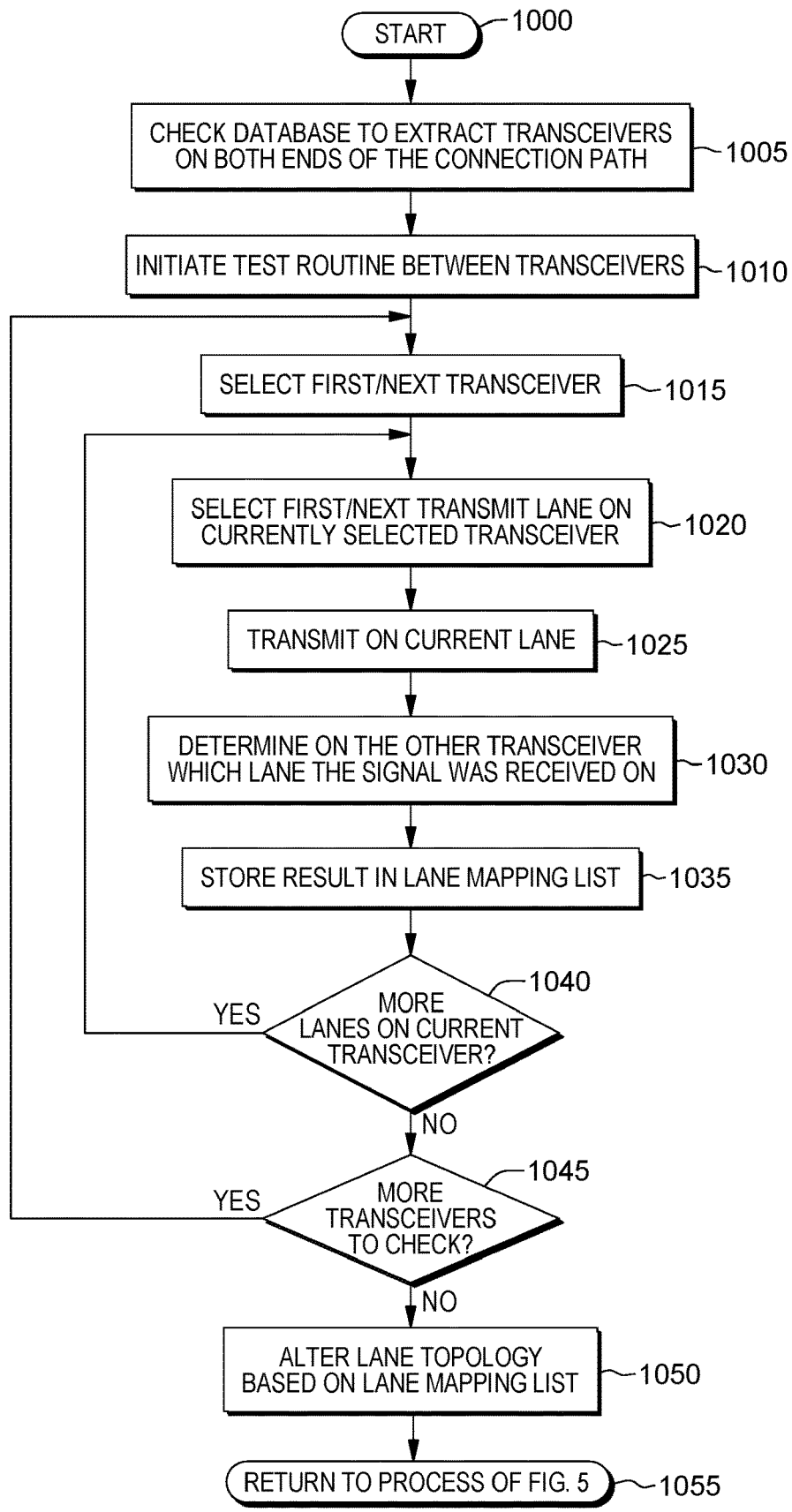
FIG. 10 depicts one embodiment of a mismatched data error detection/remediation workflow which identifies a location of receive lane mismatch errors and performs in situ optical lane restructuring, in accordance with one or more aspects of the present invention.

FIG. 8 is an example instance where transceiver data is received via an unexpected optical lane assignment, such that a cabling error is detected within the connection path, leading to receive data that is considered incorrect or corrupt. With the process of FIG. 5, the condition of FIG. 8 can be identified as a result of executing decision block 525, leading to block 530 being executed to swap or reassign optical lanes via software reassignment, and thereby prevent the need for a user to physically change one or more optical cables in the connection path. An example of a lane restructuring process such as disclosed herein is depicted in FIG. 10, and described further below. Again, appropriate cable orientation is assumed in the example of FIG. 8, and as noted, lanes 1-12 are receive lanes and lanes 13-24 are transmit lanes for the optical transceivers at the different ends of the connection path.

As noted, FIG. 9 depicts one embodiment of an optical cable misplug error identification workflow which facilitates identifying location of a misplugged optical cable within a connection path that cannot be corrected by lane restructuring. In one or more embodiments, the process of FIG. 9 can be implemented by an optical cable misplug location identification module, such as module 418 of computing network 400, shown in FIG. 4.

The workflow begins 900 with determining which transceiver lanes are receiving a signal, and which lanes are not 905. For instance, a receive lane would not receive a signal if a transmit lane is connected to another transmit lane at the ends of the cable, or a receive lane is connected to another receive lane at the different ends of the cable. As understood, a correct connection should have a transmit lane of one transceiver connected to a receive lane of another transceiver at the different cable ends. In one or more embodiments, the determination can be made in situ based on expected data not being transmitted or received on the receive lanes. In one or more embodiments, a test routine can be initiated one transmit lane at a time to make the determination. In one or more embodiments, portions of the FIG. 9 workflow can be used on lanes that are transmitting or receiving a signal to determine if the lanes are correct, which can help with determining the location of a misplugged optical cable.

As illustrated in FIG. 9, the executing module or code, in one embodiment, extracts the full correct optical plug connection path 910 from a database, such as the network optical connection mapping database 442 in the example computing network embodiment of FIG. 4. For example, the plug path for a single connection may be: first system transceiver type A→first patch panel type A→second patch panel type B→second system transceiver type A. Correct cabling of this connection path would require a type A-type A cable (to connect the first system to the first patch panel, a type A-type B cable to connect the first patch panel to the second patch panel, and a type A-type B cable to connect the second patch panel to the second system.

Processing builds a plug possibility list of all combinations of optical plug types that fit the correct optical connector types at each connection point in the full connection path 915. For example, if a specific transceiver at one end of a connection path has a type A connector, the list created would consider any transceiver type that fits into that form-factor (e.g., type B, type C, etc.) because fiber-optic cables with any of those connector types could all be incorrectly plugged into the type A connector. Continuing with the above example, which requires three cables in the noted connection path, a plug possibility list may include the following cables (note that this is only a partial list by way of example, and many more combinations would be included in the full list):

type A-type A, type A-type A, type A-type A
type A-type A, type A-type A, type A-type B
type A-type A, type A-type A, type A-type C
type A-type A, type A-type B, type A-type A In one or more embodiments, the correct plug path combination is not included in this list since the workflow would not be executed if there wasn't a plug issue that led to one or more lanes not being able to transmit or receive signals.

The process then begins or continues in an iteration loop by selecting a first or next plug path combination in the plug possibility list 920. Processing determines whether the current plug path combination creates a match to the currently-observed, incorrect lane assignment 925. In one or more embodiments, portions of the process of FIG. 10 can be used on lanes that are transmitting or receiving signals to assist in finding and filtering out potential matches (e.g., a match in transmit and/or receive lanes may be found, but the process of FIG. 10 can assist with determining which data is appearing at each lane, which could uncover that the correct plug path combination being evaluated is not actually a match, even though it appears to match initially, if only transmit-to-transmit and/or receive-to-receive alignment is checked.

If a match is found, then the process adds the current plug path combination being evaluated to the possible problem list 930 and determines whether there are more plug path combinations in the list to be evaluated 935, and if so, repeats the loop. Note that in certain instances, it is possible that a connection path can be identified that swaps connections, then swaps them back, and contains the real misplugged optical cable, all within the connection path. In those instances, the plug path combination can either be given lower priority in the possible output list, or filtered out completely. Once all plug path combinations have been evaluated, the process outputs (e.g., electronically forwards) the possible problem list 940 before returning, for instance, to the processing of FIG. 5, 945. Note that the list can be a short list, in most cases, with only one plug path combination identified, which can then be used by the computing network administrator or system, or by a robotic system, to rapidly locate and replace the misplugged optical cable within the connection path to correct the communication issue. If the possible problem list is greater than 1, then the list can be prioritized based on a least number of misplugs in the path, most common cables used within the network optical cable connection mapping database, or any other criteria that a system administrator, or control system, chooses.

FIG. 10 depicts one embodiment of an optical cable mismatch error detection/remediation workflow which identifies location of one or more receive lane errors and performs in situ optical lane restructuring, in accordance with one or more aspects of the present invention. For instance, the workflow of FIG. 10 performs in situ optical lane restructuring if all transmit and receive lanes are operational, but misaligned (for instance, transmit lanes on one transceiver end misalign with receive lanes on another transceiver end). In one or more embodiments, the workflow of FIG. 10 can be executed by an optics lane mismatch identification and rerouting module 420, such as depicted in the computing network 400 of FIG. 4.

Processing begins 1000 with checking the database to extract identifying data on the transceivers at both ends of the communication or connection path 1005. That is, processing determines which transceivers are communicating across the connection path from the different ends of the path. In one or more embodiments, if both transceivers are located within the same system, then the database checked can be the optical connection mapping database 422 within the computing system, such as within computing system 410 in the computing network 400 of FIG. 4 example. In one or more embodiments, if the transceivers are in different systems (e.g., one is in computing system 410 and the other is in a computing system 430 in the example of FIG. 4), then the database checked can be, for instance, the network optical connection mapping database 442 in the computing network 400 example of FIG. 4.

Processing initiates a test routine between the transceivers 1010. In one or more embodiments, test initiation can pause any communication between the transceivers (which is incorrect anyhow if the process of FIG. 10 is being executed), and prepares the system(s) for a brief test that is to occur. In one or more embodiments, both transceivers receive program instructions that indicate that a test is going to be performed. In one or more embodiments, test initiation is accomplished either within one computing system (e.g., if both transceivers are within a single system), or between transceivers themselves (even though lane assignments are mixed up, a data transmission can still be transmitted and read/interpreted on each end if done on a single lane), or using a communication server, or other type of device that can communicate between multiple systems and/or transceiver end points.

The workflow begins and/or continues an iteration loop to select a first or next transceiver 1015. In most instances, there will be two transceivers in the loop, but in certain instances, there may be more, such as in the case of an optical splitter being in the path. The process begins and/or continues a nested loop, where the first or next transmit lane is selected on the currently-selected transceiver 1020. Although shown as an iteration loop, in one or more embodiments, this nested loop can be performed on all transmit lanes for the currently-selected transceiver in parallel, provided that the transmitted data indicates the origin lane of the transmitted signal.

A signal is transmitted on the currently-selected lane 1025. In one or more embodiments, this can be a simple ping signal. In one or more other implementations, the signal can transmit data that identifies the lane that the signal is transmitted from.

Processing determines on the other transceiver which lane the signal was received on 1030. The result of the transmit and receive pair is then stored in a temporary lane mapping list 1035. In one or more embodiments, the lane mapping list can be stored within network optical connection mapping database 442 (in the example of FIG. 4) for transceivers located on separate systems (i.e., transceivers communicating between, for instance, computing system 410 and a computing system 430, in the example of FIG. 4). In one or more embodiments, the lane mapping list can be stored within optical connection mapping database 422 of computing system 410 for transceivers located within the same system (i.e., two transceivers communicating within computing system 410).

Processing determines whether there are more transmit lanes on the current transceiver to check 1040, and if there are more transmit lanes, processing loops back to select a next transmit lane on the currently-selected transceiver 1020 to repeat the process for the next transmit lane. If there are no additional transmit lanes on the current transceiver to check, then processing determines whether there are more transceivers to check 1045 within the current connection path. If there are one or more transceivers to check within the current connection path, then the workflow loops back to select a next transceiver 1015 to repeat the process on the next transceiver.

If there are no additional transceivers to check within the current connection path, then processing next alters the lane topology based on the completed lane mapping list 1050 before returning to, for instance, the process of FIG. 5, 1055. For example, if it is recognized that a transmitted signal on lane 1 is expected to be received on receive lane 13, which is then stored in a first register of memory on the receiving system and that a transmitted signal on lane 2 is expected to be received on receive lane 14, which is then stored in a second register of memory on the receiving system, but a miswiring has caused the transmitted signal on lane 1 to be received on receive lane 14 and the transmitted signal on lane 2 to be received on lane 13, then software alters the lane topology by swapping the data within the first and second registers of the receiving system prior to any further action being taken with the data. Note that in one or more embodiments, lane topology can be altered via software abstraction using firmware, middleware, or within the system's operating system, as desired.

Advantageously, the process of FIG. 10 requires no hardware changes to input/output cards, or designs using optical transceivers, and a cable can be used that was not originally planned (which may assist in saving money, as opposed to having to spend additional money on a new cable, or having an administrator/operator having to reroute cables within a data center, which is not easy or fast, given the large number of cables in a typical data center). Another advantage of the systems and processes disclosed herein is that they can be readily adapted to use with future cable designs.

Those skilled in the art will note that provided herein, in one or more aspects, is a computer-implemented method which includes detecting, by at least one processor, an optical cable misplug error in a connection path between optical transceivers of a computing network, where the connection path includes one or more optical cables. The detecting includes evaluating, by the at least one processor, operation of an optical transceiver of the connection path. The evaluating includes determining whether a receive lane of the optical transceiver is receiving a signal during the evaluating operation of the optical transceiver, and detecting the optical cable misplug error where the receive lane of the optical transceiver is not receiving the signal. In addition, the computer-implemented method includes identifying, by the at least one processor based on detecting the optical cable misplug error, a location of a misplugged optical cable in the connection path between the optical transceivers of the computing environment. Advantageously, the computer-implemented method improves performance within a computing network containing optical cable connections within and/or between computing systems of the network. Performance is improved by detecting and facilitating remediation of an optical cable misplug error within the computing network to enhance data transfer across the connection path. Further, the computer-implemented method provides improved root cause identification of a misplugged optical cable in a connection path between optical transceivers of the computing network.

In one or more embodiments, the identifying is based on a current received data condition on a plurality of receive lanes of the optical transceiver during evaluating operation of the optical transceiver. Advantageously, the identifying based on the current received data condition on the plurality of receive lanes of the optical transceiver facilitates improved root cause identification of a misplugged optical cable in the connection path between optical transceivers of the computing network.

In one or more embodiments, identifying the location of the misplugged optical cable in the connection path further includes cross-mapping different possible optical cable types for the connection path to generate a plurality of mappings of the different optical cable types for the connection path, and matching one or more mappings of the plurality of different optical cable types to the current received data condition on the plurality of receive lanes of the optical transceiver. Advantageously, matching one or more mappings of the plurality of different optical cable types to the current received data condition on the plurality of receive lanes of the optical transceiver facilitates improved root cause identification of a misplugged optical cable in the connection path between optical transceivers of the computing network, and thereby improves detection and remediation of the optical cable misplug error.

In one embodiment, the computer-implemented method further includes generating, by the at least one processor, a potential optical cable misplug configuration list identifying a misplugged optical cable type in the connection path which results in the current received data condition on the plurality of receive lanes of the optical transceiver. Advantageously, generating the potential optical cable misplug configuration list identifying a misplugged optical cable type in the connection path facilitates improved root cause identification of the misplugged optical cable in the connection path between optical transceivers of the computing network.

In one or more embodiments, the computer-implemented method further includes initiating, by the at least one processor, an action to facilitate correcting the misplugged optical cable in the connection path between the optical transceivers of the computing network by changing out an optical cable of the one or more optical cables connected in the connection path. Advantageously, initiating, by the at least one processor, an action to facilitate correcting the misplugged optical cable in the connection path improves performance by facilitating remediation of the optical cable misplug error within the computing network, which enhances data transfer across the remediated connection path.

In one embodiment, the computer-implemented method further includes monitoring, by the at least one processor, for a change in the connection path indicative of a changing out of the optical cable of the one or more optical cables of the connection path. Further, in one embodiment, initiating the action can include forwarding the location of the misplugged optical cable in the connection path to a network administrator to facilitate remediation of the optical cable misplug error. Advantageously, monitoring for the change in the connection path indicative of the changing out of the misplugged optical cable and/or forwarding the location of the misplugged optical cable in the connection path to a network administrator to facilitate remediation of the optical cable misplug error facilitates remediation of the optical cable misplug error within the computing network to enhance data transfer across the connection path.

In one or more embodiments, the optical transceiver includes multiple receive lanes, and the evaluating operation of the optical transceiver includes determining that not all receive lanes of the multiple receive lanes of the optical transceiver are receiving a signal during evaluating operation of the optical transceiver, where the detecting includes detecting the optical cable misplug error based on one or more receive lanes of the multiple receive lanes of the optical transceiver not receiving the signal. Advantageously, determining that not all receive lanes of the multiple receive lanes of the optical transceiver are receiving the signal facilitates improved root cause identification of the misplugged optical cable in the connection path between optical transceivers of the computing network. Further, performance is improved by detecting and facilitating remediation of the optical cable misplug error within the computing network to enhance data transfer across the respective connection path.

In one or more embodiments, the connection path is an external optical connection path between computing systems of the computing network, and the identifying includes using an optics mapping verification module in identifying, by the at least one processor, the location of the misplugged optical cable in the connection path between the optical transceivers of the computing network. Advantageously, performance within a computing network containing optical cable connections between computing systems of the network is improved by detecting and facilitating remediation of an optical cable misplug error within the computing network, which enhances data transfer between systems of the network across the remediated connection path.

Those skilled in the art will further note that provided herein, in one or more additional aspects, is a computer-implemented method which includes detecting, by at least one processor, an optical cable mismatch error in a connection path between optical transceivers of a computing network, where the connection path includes one or more optical cables. The detecting includes evaluating, by at least one processor, operation of an optical transceiver of the connection path. The evaluating includes determining that data on one or more optical lanes of the optical transceiver is lane-mismatched data. In addition, the computer-implemented method includes restructuring one or more lane assignments of the optical transceiver, based on determining that the data on one or more optical lanes of the optical transceiver is lane-mismatched data. The restructuring is to address the detected optical cable mismatch error. Advantageously, the computer-implemented method improves performance within a computing network containing optical cable connections within and/or between computer systems of the network. Performance is improved by detecting and remediating an optical cable mismatch error within the computing network to enhance data transfer across the connection path.

In one or more embodiments, the restructuring one or more lane assignments of the optical transceiver, based on determining that the data on the one or more optical lanes of the optical transceiver is lane-mismatched data, includes restructuring the one or more lane assignments of the optical transceiver absent any physical change to the one or more optical cables of the communication path between the optical transceivers of the computing network. Advantageously, restructuring the one or more lane assignments of the optical transceiver, absent any physical change to the one or more optical cables of the communication path, facilitates automated remediation of the detected optical cable mismatch error.

In one or more implementations, the restructuring one or more lane assignments of the optical transceiver includes altering in situ the one or more lane assignments of the optical transceiver, based on determining that the data on the one or more optical lanes of the optical transceiver is lane-mismatched data, where the altering in situ of the one or more lane assignments addresses the detected optical cable mismatch error. Advantageously, altering in situ the one or more lane assignments of the optical transceiver, based on determining that the data on the one or more optical lanes of the optical transceiver is lane-mismatched data, facilitates automated remediation of the detected optical cable mismatch error.

In one embodiment, the optical transceiver includes a data transmit and receive system with multiple optical lanes and associated registers, and wherein the restructuring one or more lane assignments includes automatically moving lane-mismatched data from one associated register of one optical lane to another associated register of another optical lane to address the detected optical cable mismatch error. In one or more embodiments, based determining that the data on multiple optical lanes is lane-mismatched data, the restructuring one or more lane assignments includes directing in software a swapping of data within two or more registers of the transmit and receive system to address the detected optical cable mismatch error in the connection path between optical transceivers of the computing network. Advantageously, automatically moving lane-mismatched data from one associated register to another associated register, for instance, by directing in software swapping of the data within the registers, facilitates automated remediation or restructuring of one or more lane assignments of the optical transceiver, based on determining that data on multiple optical lanes is lane-mismatched data.

In one or more embodiments, the detecting and restructuring are based on initiating a test routine between the optical transceivers of the connection path. Advantageously, initiating the test routine between optical transceivers facilitates detecting and remediating an optical cable mismatch error in the connection path between the optical transceivers of the computing network.

In one embodiment, the optical transceiver is one optical transceiver of the connection path, and the evaluating includes receiving a test signal from another optical transceiver of the connection path on respective optical lanes of multiple optical lanes of the one optical transceiver, where the data includes the test signal. Further, the determining includes generating a test lane mapping for the one optical transceiver based on receiving the test signal, where the test lane mapping facilitates determining that data on one or more optical lanes of the optical transceiver is the lane-mismatched data. Advantageously, generating the test lane mapping facilitates improved identification of one or more optical cable mismatch errors, and facilitates remediation of any mismatch errors by restructuring one or more lane assignments of the optical transceiver to address the mismatch errors.

In one embodiment, receiving the test signal includes sequentially receiving the test signal from different transmit lanes of the other optical transceiver of the connection path on the respective optical lanes of the multiple optical lanes of the one optical transceiver of the connection path. Advantageously, sequentially receiving the test signal from different transmit lanes of the other optical transceiver of the connection path on different respective optical lanes of the multiple optical lanes of the one optical transceiver, facilitates producing a lane mapping list (or test lane mapping) which can be used to compare the actual lanes the test signal is received on, versus the expected lanes that the test signal should be received on pursuant to a prespecified lane topology for the optical transceivers.

In one embodiment, the detecting and the restructuring are implemented via software in a computing system of the computing network, where the computing system includes the optical transceiver. Advantageously, the optical mismatch error detection and remediation processes presented facilitate addressing a mismatch error within a computing system of the computing network, and/or between computing systems of the computing network.

Computer systems and computer program products relating to one or more aspects are also described and claimed herein.

In one or more implementations, a method for in situ (i.e., situated in the original place) lane restructuring for optical transceivers is provided which includes, for instance: determining, using an optics verification mapping module, whether all receive lanes within a connection path between two or more optical transceivers are receiving a signal, and identifying, in the event one or more of the receive lanes are not receiving a signal, the location of a misplugged optical cable (e.g., an incorrect cable type) within the connection path. The method further includes determining, in the event all receive lanes are receiving the signal, whether data is mismatched or corrupted on one or more receive lanes of the connection path, and if so, altering in situ the lane mapping between the two or more optical transceivers, without making a physical change to the optical cabling in the connection path.

In one or more embodiments, the determination whether receive lanes are receiving the signal can be performed via a software abstraction layer. In one example, a test signal may not be received if a transmit lane on one transceiver aligns with a transmit lane on another transceiver, or if a receive lane on one transceiver aligns with a receive lane on another transceiver.

In one or more embodiments, the identification of a cable mismatch can be accomplished through cross-mapping of different cable types within the connection path, and comparing each of the mappings to the current condition observed on the connection path within the system. In one embodiment, identification of an incorrect cable in the connection path can include determining whether mismatched data appears on one or more receive lanes in the connection path to further filter and more accurately identify the location of a problem cable in the path.

In one or more embodiments, the location of a misplug event can be provided as diagnostic information in a list of one or more potential physical locations and/or optical cables in a connection path to be checked and/or replaced.

In one embodiment, the error determination can be made if data appears correct but is being received on the wrong lanes, for instance, because of an incorrect cable type within the connection path. As noted, altering of lane mapping between two or more optical transceivers can be performed via software abstraction. For instance, the software abstraction can be performed using firmware, middleware, or a system's operating system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    detecting, by at least one processor, an optical cable mismatch error in a connection path between optical transceivers of a computing network, the connection path including one or more optical cables, and the detecting comprising:
        evaluating, by at least one processor, operation of an optical transceiver of the connection path, the evaluating comprising:
            determining that data on one or more optical lanes of the optical transceiver is lane-mismatched data; and
    restructuring one or more lane assignments of the optical transceiver, based on determining that the data on one or more optical lanes of the optical transceiver is lane-mismatched data, the restructuring addressing the detected optical cable mismatch error.

2. The computer-implemented method of claim 1, wherein the restructuring one or more lane assignments of the optical transceiver, based on determining that the data on one or more optical lanes of the optical transceiver is lane-mismatched data, includes restructuring the one or more lane assignments of the optical transceiver absent any physical change to the one or more optical cables of the communication path between the optical transceivers of the computing network.

3. The computer-implemented method of claim 1, wherein the restructuring one or more lane assignments of the optical transceiver comprises altering in situ the one or more lane assignments of the optical transceiver, based on determining that the data on the one or more optical lanes of the optical transceiver is lane-mismatched data, the altering in situ the one or more lane assignments addressing the detected optical cable mismatch error.

4. The computer-implemented method of claim 1, wherein the optical transceiver includes a data transmit and receive system with multiple optical lanes and associated registers, and wherein the restructuring one or more lane assignments includes automatically moving lane-mismatched data from one associated register of one optical lane to another associated register of another optical lane to address the detected optical cable mismatch error.

5. The computer-implemented method of claim 4, wherein based on determining that data on multiple optical lanes is lane-mismatched data, the restructuring one or more lane assignments includes directing in software a swapping of data within two or more registers of the transmit and receive system to address the detected optical cable mismatch error in the connection path between optical transceivers of the computing network.

6. The computer-implemented method of claim 1, wherein the detecting and the restructuring are based on initiating a test routine between the optical transceivers of the connection path.

7. The computer-implemented method of claim 6, wherein the optical transceiver is one optical transceiver of the connection path, and wherein the evaluating further includes:
    receiving a test signal from another optical transceiver of the connection path on respective optical lanes of multiple optical lanes of the one optical transceiver, where the data comprises the test signal; and
    wherein the determining includes generating a test lane mapping for the one optical transceiver based on receiving the test signal, the test lane mapping facilitating determining that data on one or more optical lanes of the optical transceiver is the lane-mismatched data.

8. The computer-implemented method of claim 7, wherein receiving the test signal comprises sequentially receiving the test signal from different transmit lanes of the other optical transceiver of the connection path on the respective optical lanes of the multiple optical lanes of the one optical transceiver of the connection path.

9. The computer-implemented method of claim 1, wherein the detecting and the restructuring are implemented via software in a computing system of the computing network, the computing system including the optical transceiver.

10. A computer system for facilitating processing within a computing network, the computer system comprising:

a memory; and at least one processor in communication with the memory, wherein the computer system is configured to perform a method, the method comprising:

detecting, by the at least one processor, an optical cable mismatch error in a connection path between optical transceivers of a computing network, the connection path including one or more optical cables, and the detecting comprising:

evaluating, by at least one processor, operation of an optical transceiver of the connection path, the evaluating comprising:

determining that data on one or more optical lanes of the optical transceiver is lane-mismatched data; and restructuring one or more lane assignments of the optical transceiver, based on determining that the data on one or more optical lanes of the optical transceiver is lane-mismatched data, the restructuring addressing the detected optical cable mismatch error.

11. The computer system of claim 10, wherein the restructuring one or more lane assignments of the optical transceiver, based on determining that the data on one or more optical lanes of the optical transceiver is lane-mismatched data, includes restructuring the one or more lane assignments of the optical transceiver absent any physical change to the one or more optical cables of the communication path between the optical transceivers of the computing network.

12. The computer system of claim 10, wherein the restructuring one or more lane assignments of the optical transceiver comprises altering in situ the one or more lane assignments of the optical transceiver, based on determining that the data on the one or more optical lanes of the optical transceiver is lane-mismatched data, the altering in situ the one or more lane assignments addressing the detected optical cable mismatch error.

13. The computer system of claim 10, wherein the optical transceiver includes a data transmit and receive system with multiple optical lanes and associated registers, and wherein the restructuring one or more lane assignments includes automatically moving lane-mismatched data from one associated register of one optical lane to another associated register of another optical lane to address the detected optical cable mismatch error.

14. The computer system of claim 13, wherein based on determining that data on multiple optical lanes is lane-mismatched data, the restructuring one or more lane assignments includes directing in software a swapping of data within two or more registers of the transmit and receive system to address the detected optical cable mismatch error in the connection path between optical transceivers of the computing network.

15. The computer system of claim 10, wherein the detecting and the restructuring are based on initiating a test routine between the optical transceivers of the connection path, and wherein the optical transceiver is one optical transceiver of the connection path, and wherein the evaluating further includes:

receiving a test signal from another optical transceiver of the connection path on respective optical lanes of multiple optical lanes of the one optical transceiver, where the data comprises the test signal; and wherein the determining includes generating a test lane mapping for the one optical transceiver based on receiving the test signal, the test lane mapping facilitating determining that data on one or more optical lanes of the optical transceiver is the lane-mismatched data.

16. The computer system of claim 15, wherein receiving the test signal comprises sequentially receiving the test signal from different transmit lanes of the other optical transceiver of the connection path on the respective optical lanes of the multiple optical lanes of the one optical transceiver of the connection path.

17. A computer program product for facilitating processing within a computing environment, the computer program product comprising:

a computer program storage medium having program instructions embodied therewith, the program instructions being executable by at least one processor to cause the at least one processor to perform a method comprising:

detecting, by the at least one processor, an optical cable mismatch error in a connection path between optical transceivers of a computing network, the connection path including one or more optical cables, and the detecting comprising:

evaluating, by at least one processor, operation of an optical transceiver of the connection path, the evaluating comprising:

determining that data on one or more optical lanes of the optical transceiver is lane-mismatched data; and restructuring one or more lane assignments of the optical transceiver, based on determining that the data on one or more optical lanes of the optical transceiver is lane-mismatched data, the restructuring addressing the detected optical cable mismatch error.

18. The computer program product of claim 17, wherein the restructuring one or more lane assignments of the optical transceiver, based on determining that the data on one or more optical lanes of the optical transceiver is lane-mismatched data, includes restructuring the one or more lane assignments of the optical transceiver absent any physical change to the one or more optical cables of the communication path between the optical transceivers of the computing network.

19. The computer program product of claim 17, wherein the restructuring one or more lane assignments of the optical transceiver comprises altering in situ the one or more lane assignments of the optical transceiver, based on determining that the data on the one or more optical lanes of the optical transceiver is lane-mismatched data, the altering in situ the one or more lane assignments addressing the detected optical cable mismatch error.

20. The computer program product of claim 17, wherein the optical transceiver includes a data transmit and receive system with multiple optical lanes and associated registers, and wherein the restructuring one or more lane assignments includes automatically moving lane-mismatched data from one associated register of one optical lane to another associated register of another optical lane to address the detected optical cable mismatch error.

* * * * *